(12) United States Patent
Takahashi et al.

(10) Patent No.: US 7,487,921 B2
(45) Date of Patent: Feb. 10, 2009

(54) READER/WRITER AND COMMUNICATION METHOD THEREOF

(75) Inventors: Toshiyuki Takahashi, Tokyo (JP);
Kunitaka Ito, Tokyo (JP); Kanjiro Shimizu, Chiba (JP)

(73) Assignee: Sony Ericsson Mobile Communication Japan, Inc., Tokyo (JP)

( * ) Notice: Subject to any disclaimer, the term of this patent is extended or adjusted under 35 U.S.C. 154(b) by 9 days.

(21) Appl. No.: 11/510,694

(22) Filed: Aug. 28, 2006

(65) Prior Publication Data
US 2007/0051809 A1    Mar. 8, 2007

(30) Foreign Application Priority Data
Sep. 5, 2005    (JP) .............................. 2005-256969

(51) Int. Cl.
*G06K 19/06* (2006.01)
(52) U.S. Cl. .................. 235/492; 235/472.02; 235/441; 235/451
(58) Field of Classification Search ................. 235/441, 235/451, 492, 472.02
See application file for complete search history.

(56) References Cited

U.S. PATENT DOCUMENTS 3,774,209 A * 11/1973 Fleming et al. ............. 342/386
7,084,739 B2 * 8/2006 Taki et al. ................... 340/10.1
2006/0038659 A1 * 2/2006 Takano et al. ............ 340/10.51

FOREIGN PATENT DOCUMENTS

EP    1489-684 A1    12/2004

\* cited by examiner

*Primary Examiner*—Uyen-Chau N Le
(74) *Attorney, Agent, or Firm*—Oblon, Spivak, McClelland, Maier & Neustadt, P.C.

(57) ABSTRACT

A reader/writer is provided. The reader/writer performing radio communication with a radio communication terminal in close proximity thereto, includes: an antenna which transmits a carrier wave of a predetermined frequency and which receives a composite wave of the carrier wave and a modulated signal of the carrier wave transmitted from the radio communication terminal; a demodulating unit which demodulates the composite wave received by the antenna; a judging unit which judges whether or not it is difficult to detect a modulated component included in the composite wave received by the antenna when the radio communication terminal is in close proximity; and a carrier-wave control unit which reduces a component of the carrier wave input into the demodulating unit when the judging unit judges that it is difficult to detect the modulated component.

6 Claims, 7 Drawing Sheets

FIG. 3A   Carrier Wave
FIG. 3B   ASK-Modulated Response
FIG. 3C   Composite Wave
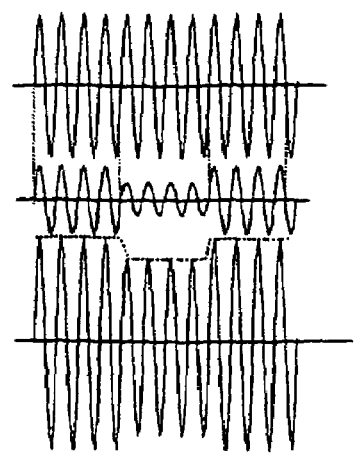
FIG. 4A   Carrier Wave
FIG. 4B   ASK-Modulated Response
FIG. 4C   Composite Wave
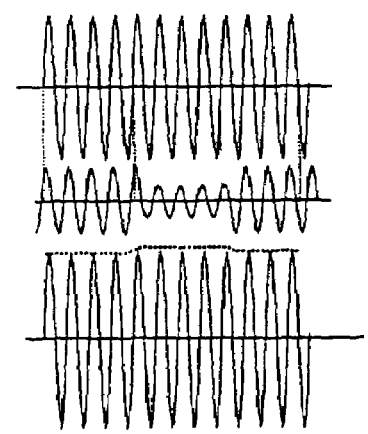
FIG. 5A   Carrier Wave
FIG. 5B   ASK-Modulated Response
FIG. 5C   Composite Wave
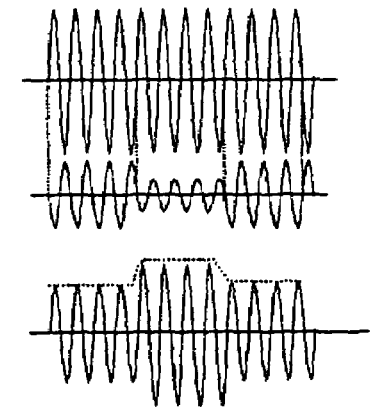

READER/WRITER AND COMMUNICATION METHOD THEREOF

CROSS REFERENCES TO RELATED APPLICATIONS

The present invention contains subject manner related to Japanese Patent Application JP 2005-256969 filed in the Japanese Patent Office on Sep. 5, 2005, the entire contents of which being incorporated herein by reference.

BACKGROUND OF THE INVENTION

1. Field of the Invention

The present invention relates to a reader/writer that communicates with a radio communication terminal including short-distance radio communication function termed a non-contact IC card or the like, and to a communication method of the reader/writer.

2. Description of the Related Art

Recently, a non-contact IC card has been widely used for a train ticket, membership card, employee ID card, payment settlement tool at stores, or the like. Such non-contact IC card performs radio communication with a reader/writer in close proximity thereto and performs authentication processing. Therefore, non-contact IC cards can be used while being carried in a wallet, pass case or the like, and so it is convenient for a user compared to the case in which a magnetic card or other cards are used.

On the other hand, there is proposed a non-contact IC card (or a circuit component having function equivalent to the IC card) incorporated into a portable electronic device such as a mobile phone unit in which similar authentication and payment settlement can be performed using such devices. Note that, in the case where an IC card function unit is assembled into a portable terminal, the unit is not necessarily card-shaped; however, if it is termed "IC card" in the following explanation a unit having function of IC card is included unless there is a specific explanation. Further, a non-contact IC card of this kind is also called "RFID (Radio Frequency Identification)", "Radio IC Tag" or the like. Although various kinds of shape such as a label, coin and stick are conceivable if those are each used as a single unit, those are called IC cards in this specification for convenience.

In the case of performing radio communication with a reader/writer, an IC card function unit is operated by electromagnetic induction of the reader/writer. In other words, tuning processing of a carrier wave of a predetermined frequency output from the reader/writer is performed on the IC card side and the detected carrier wave is modulated by ASK (Amplitude Shift Keying) or other methods, and then data is transmitted to the reader/writer side. The ASK modulation is an amplitude modulation in which a digital signal is represented by a difference in the amplitude of a carrier wave.

FIG. 1 is a schematic diagram showing a state of communication between a reader/writer and an IC card. As shown in this figure, a reader/writer 1 includes a loop antenna 2 to transmit a carrier wave F1(x) of a predetermined frequency. An IC card 3 also includes a loop antenna 4 to transmit a response waveform F2(x) on which ASK-modulation was performed by the loop antenna 4. The loop antenna 2 in the reader/writer 1 receives a composite wave of the carrier wave F1(x) and the response waveform F2(x).

Japanese Published Patent Application No. 2003-67693 (FIG. 2) discloses a non-contact IC card.

SUMMARY OF THE INVENTION

In the case where an IC card function unit performs radio communication with a reader/writer, the IC card function unit is operated by electromagnetic induction of the reader/writer. Therefore, basically the radio communication can be performed accurately when an antenna assembled in the IC card is in close proximity to the reader/writer as much as possible. However, in the case where the IC card function unit is in close proximity to the reader/writer, there may be a certain point at which the communication may not be carried out.

The occurrence of such state in which the communication may not be performed is explained in the followings. Specifically, the radio communication between the IC card function unit and the reader/writer is performed between antennas of exclusive use that are included respectively. Both the antennas are tuned to a carrier frequency and are adjusted such that the transmission characteristics become optimal. However, regarding each antenna, since a resonant frequency is adjusted in a free space, original characteristics may not be taken advantage of when the antennas being coupled or when an antenna and a metal body being coupled in a short distance. Depending on the coupled state, a frequency of the antennas being out of tune and a phase difference between a transmitting waveform and a receiving waveform becomes large, causing a phenomenon in which a phase is reversed at certain point.

FIG. 2 shows a relationship between a distance from an IC card to a reader/writer and a resonant frequency of a reader/writer. When the IC card and the reader/writer come close to each other, the resonant frequency fa is almost constant up to a certain point, but it rises when coming close beyond the certain point.

If there is such change in the resonant frequency, a phase difference between a transmitting waveform and a receiving waveform occurs. In the case of the ASK-modulation widely used in non-contact IC cards, communication is performed using data amplitude of a composite wave made of transmitting and receiving waves. Therefore, a change in data amplitude is cancelled when a phase difference between the waveforms is in a halfway state. The point where the cancellation occurs is termed "Null state", because the communication is not performed.

FIGS. 3, 4 and 5 are diagrams showing examples of states regarding radio communication between an IC card function unit and a reader/writer. FIGS. 3A, 4A and 5A show a carrier waveform transmitted by the reader/writer; FIGS. 3B, 4B and 5B show a response waveform ASK-modulated and FIGS. 3C, 4C and 5C show a composite wave of both waveforms. The composite wave is detected by the reader/writer to receive data transmitted from the IC card.

Here, FIGS. 3A to 3C show the state in which the phase of the response wave from the IC card function unit is the same as that of the carrier wave from the reader/writer. FIGS. 5A to 5C show the state in which the phase of the response wave from the IC card function unit is reverse to that of the carrier wave from the reader/writer. FIGS. 4A to 4C show a halfway state regarding the phase difference between the state of FIG. 3 and the state of FIG. 5.

As shown in FIGS. 3A to 3C, in the case where the phase of the response wave from the IC card function unit is the same as that of the carrier wave from the reader/writer, a change in the level corresponding to the response wave ASK-modulated appears in the composite wave shown in FIG. 3C, and data can be received accurately by the reader/writer. Also, as shown in FIGS. 5A to 5C, in the case where the phase of the response wave from the IC card function unit is reverse to that of the carrier wave from the reader/writer, a change in the level reverse to the response wave ASK-modulated appears in the composite wave shown in FIG. 5C. Although a change of waveform in this case is reverse to the state of the same phase of FIG. 3, data can also be received accurately by the reader/writer.

On the contrary, in the case of the phase difference in the halfway state shown in FIGS. 4A to 4C, there is almost no change in the level of the composite wave in FIG. 4C, and the data may not be received in this state. The state shown in FIGS. 4A to 4C is the null state mentioned above.

The state changes among FIGS. 3 to 5 depending on a distance between an antenna on the IC card side and an antenna on the reader/writer side. When there is a certain distance between the IC card and the reader/writer, for example, the state of the same phase that is shown in FIG. 3 is obtained. When the IC card is much closer to the reader/writer, the state of the reverse phase that is shown in FIG. 5 is obtained. Further, the null state shown in FIG. 4 occurs at a specific point between the two states.

FIG. 6 shows an example of the relationship between a tuning frequency f0 of the IC card (tag) and a tuning frequency f0 of the reader/writer, in which a null area where communication may not be performed occurs in the range of the frequencies being in a certain relationship.

In order to prevent the occurrence of such null state, there are such measures as devising the shape of antennas so as not to cause a reverse phase, employing a structure in which metal material is limited to a minimum when the IC card function unit is assembled into the portable terminal, or the like. However, it is difficult to prevent the occurrence of the null state completely, because there is a limit of modifying the shape of antenna or the like.

In view of the above, it is desirable to prevent the occurrence of the null state efficiently when radio communication is performed with the reader/writer in a non-contact manner.

According to an embodiment of the present invention, there is provided a reader/writer that performs radio communication with a radio communication terminal in close proximity thereto, including: an antenna, a demodulating unit, a judging unit and a carrier-wave control unit. The antenna transmits a carrier wave of a predetermined frequency and receives a composite wave of the carrier wave and a modulated signal of the carrier wave transmitted from the radio communication terminal. The demodulating unit demodulates the composite wave received by the antenna. The judging unit judges whether or not it is difficult to detect a modulated component included in the composite wave received by the antenna when the radio communication terminal is in close proximity. The carrier-wave control unit reduces a component of the carrier wave input into the demodulating unit when the judging unit judges that it is difficult to detect the modulated component.

Accordingly, in the state in which it is difficult to detect the modulated component included in the received composite wave, in other words, when occurrence of the null state is detected based on the position relation between the reader/writer and the radio communication terminal, the carrier wave that the reader/writer deals with is weakened and consequently the null state is avoided.

BRIEF DESCRIPTION OF THE DRAWINGS

FIGS. 3A to 3C are waveform charts showing a state of communication between a reader/writer and a communicating unit in the case of the same phase;

FIGS. 4A to 4C are waveform charts showing a state of communication between a reader/writer and a communicating unit in the case of a halfway phase difference;

FIGS. 5A to 5C are waveform charts showing a state of communication between a reader/writer and a communicating unit in the case of the reverse phase;

DESCRIPTION OF THE PREFERRED EMBODIMENTS

A first embodiment of the present invention is explained in the followings with reference to FIGS. 7 to 10.

Figure 1:
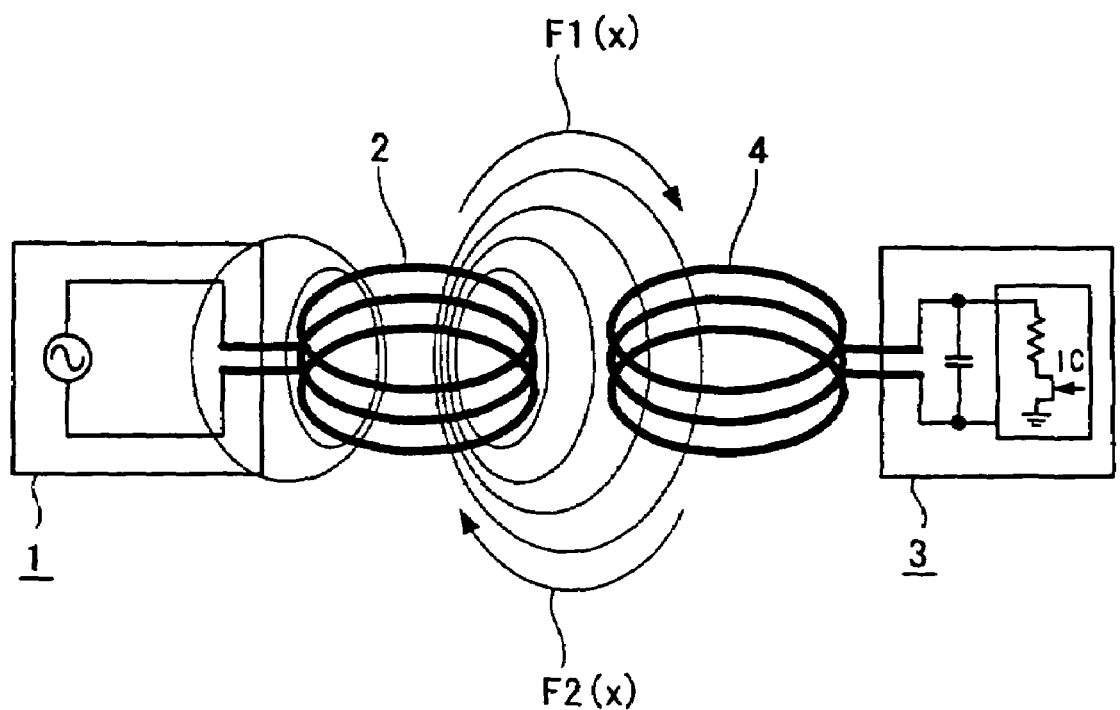
FIG. 1 is a diagram showing an example of a system configuration of related art.
Figure 2:
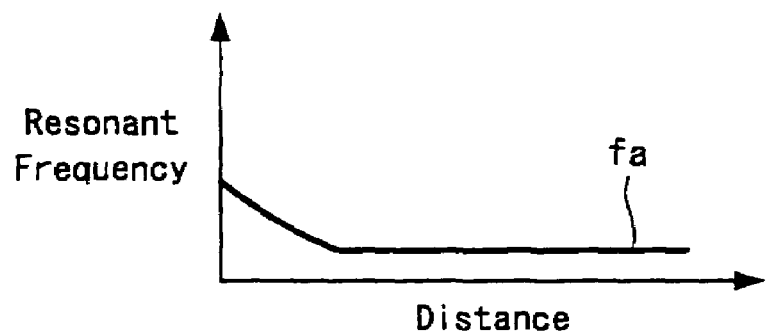
FIG. 2 is a characteristic curve showing an example of a relationship between a distance from a reader/writer to an IC card and a resonant frequency.
Figure 6:
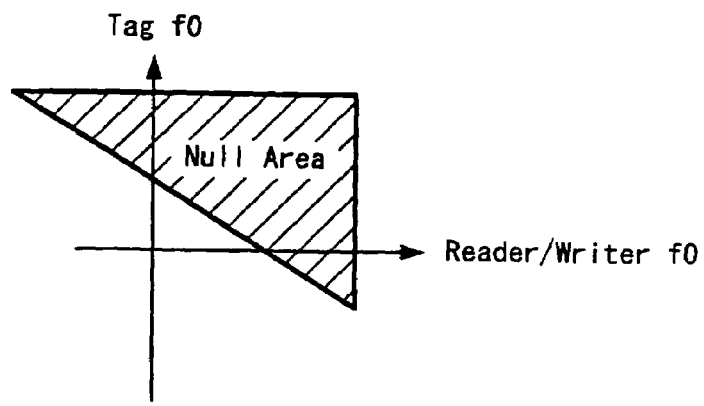
FIG. 6 is a frequency characteristic chart showing a range where communication between a reader/writer and a communicating unit is not performed.
Figure 7:
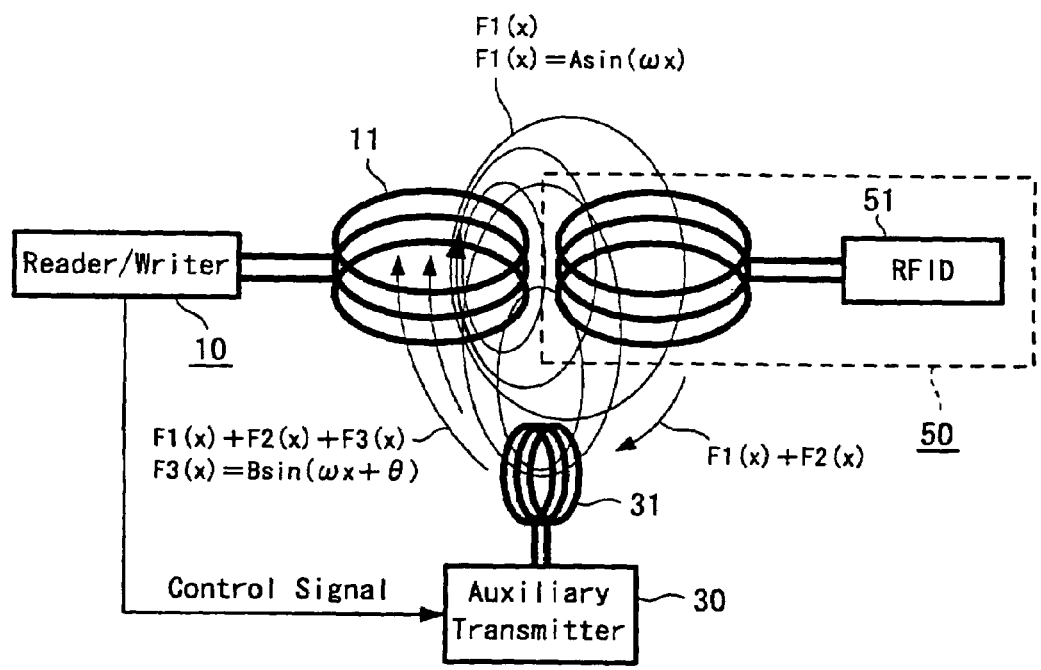
FIG. 7 is a diagram showing a system configuration according to a first embodiment of the present invention.

In this embodiment the present invention is applied to a reader/writer that communicates with a non-contact IC card. FIG. 7 shows a system configuration in which an RFID unit 51 equivalent to a non-contact IC card function unit is incorporated in a portable terminal 50. In the case of an IC card being a single entity, only the RFID unit 51 is provided. The portable terminal 50 of such configuration is brought in close proximity to a reader/writer 10 provided at a predetermined place, and a bidirectional communication with the reader/writer 10 is performed. On the reader/writer 10 side are performed authentication processing for the RFID unit 51, payment processing and the like. A distance with which the communication between the reader/writer 10 and the RFID unit 51 can be performed is a short distance of several to several tens of centimeters.

Here, in this embodiment, an auxiliary transmitter 30 is provided at a position adjacent to the reader/writer 10 and a signal of a predetermined frequency is transmitted from an antenna 31 of the auxiliary transmitter 30 in accordance with the communication state detected by the reader/writer 10. The processing and configuration with which a signal is transmitted from the auxiliary transmitter 30 are explained later on.

In the communication between the reader/writer 10 and the RFID unit 51, a carrier wave $F1(x)$ of a predetermined frequency (for example, 13.56 MHz) is transmitted from an antenna 11 of the reader/writer 10 to be received by the RFID unit 51. A response wave $F2(x)$ to the carrier wave $F1(x)$ received is prepared in the RFID unit 51 to be transmitted. The response wave F2(x) is ASK-modulated (amplitude-modulated) based on data regarding authentication, payment settlement or the like. Then, a composite wave [F1(x)+F2(x)], in which the carrier wave F1(x) transmitted by itself and the response wave F2(x) transmitted from the RFID unit 51 are mixed, is received by the reader/writer 10.

Subsequently, whether or not the received composite wave [F1(x)+F2(x)] is in the above-described null state is judged by the reader/writer 10. If the null state is detected, the auxiliary transmitter 30 starts operating, and a signal F3(x) to avoid the null state is transmitted from the antenna 31 of the auxiliary transmitter 30. With the transmission of the signal F3(x), a composite wave [F1(x)+F2(x)+F3(x)] is received by the reader/writer 10. Note that, each of signals F1(x), F2(x), F3(x) is of the same frequency, and the signal F3(x) with which the null state is avoided is a signal that acts on weakening the carrier wave F1(x).

On explaining a specific example, $F3(x)=A\sin(\omega x+\pi)=-A\sin(\omega x)=-F1(x)$ is obtained, wherein the carrier wave $F1(x)=A\sin(\omega x)$, the re-composite signal $F3(x)=B\sin(\omega x+\theta)$, $A=B$ and $\theta=\pi$. Therefore, $F1(x)+F2(x)+F3(x)=F1(x)+F2(x)-F1(x)=F2(x)$ is obtained, and consequently the response wave F2(x) being buried due to the phase difference between the carrier wave F1(x) and the response wave F2(x) can be extracted by the reader/writer 10.

Figure 8:
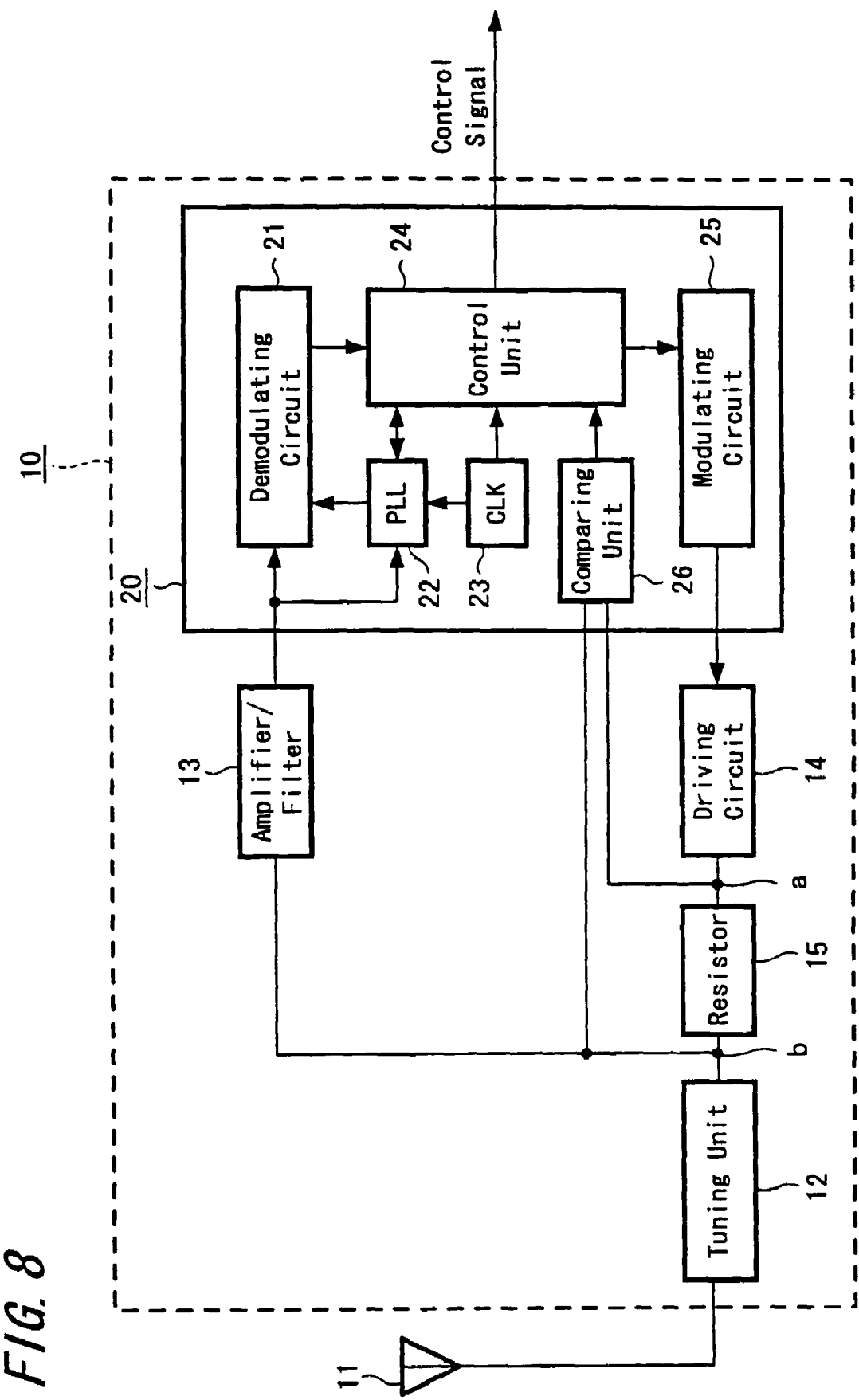
FIG. 8 is a block diagram showing a configuration of a reader/writer according to the first embodiment of the present invention.

FIG. 8 is a diagram showing a specific example of a configuration of the reader/writer 10. First, explanation is given to the configuration for reception. A signal received by the antenna 11 is supplied to an amplifier/filter 13 through a tuning unit 12. Then, the signal is amplified and filtered in the amplifier/filter 13 to be supplied to a demodulating circuit 21 within a transmitting/receiving block 20. In the demodulating circuit 21, data ASK-modulated is demodulated from the received signal to be supplied to a control unit 24. A reference-frequency signal synchronized with the received signal is supplied from a PLL (Phase Locked Loop) circuit 22 to the demodulating circuit 21, and demodulation processing is performed using the reference signal. A reference clock is supplied to the PLL circuit 22 from a clock generating unit 23, and the PLL processing using this clock and the received data is performed. The reference clock is also supplied to the control unit 24 and the like in the transmitting/receiving block 20.

Next, explanation is given to a configuration for transmission from the reader/writer 10 shown in FIG. 8. Transmission data output from the control unit 24 is supplied to a modulating circuit 25. Then, the data is modulated by the carrier wave frequency to be supplied to a driving circuit 14 where a transmission signal with a predetermined output power is prepared. The driving circuit 14 is connected to the tuning unit 12 and antenna 11 through a resistor 15, and the transmission signal is wirelessly transmitted from the antenna 11. The tuning unit 12 is a circuit tuning a frequency in the antenna 11 to a carrier wave frequency. Further, the resistor 15 of a comparatively small resistance is connected to detect the state of radio communication.

Voltages at one end (point "a") and the other end (point "b") of the resistor 15 connected between the driving circuit 14 and the tuning unit 12 are compared in a comparing unit 26 within the transmitting/receiving block 20, and a difference thereof is judged in the control unit 24. In the case where the voltage difference detected by the comparing unit 24 is in a predetermined state, the control unit 24 judges that the state of radio communication between the reader/writer 10 and the portable terminal 50 (or IC card) in close proximity thereto has been in the null state (or the state close to the null state) described above. When judged that it is the null state, the control signal is output to the auxiliary transmitter 30.

Here, there is explained the principle in which the control unit 24 judges the null state from the voltage difference between both ends of the resistor 15. A potential at one end (point "a") of the resistor 15, that is, on the output side of the driving circuit 14 is almost constant both in the state in which radio communication with the IC card or the like is performed and in the state in which the radio communication therewith is not performed. On the contrary, when the IC card, portable terminal or the like is brought in close proximity to the reader/writer 10, a resonant frequency of the reader/writer 10 rises to be out of the carrier wave frequency. Therefore, an impedance mismatching occurs between an antenna and an output of the driving circuit 14. As a result, a voltage at the other end (point "b") of the resister 15 falls. On detecting this voltage drop, the control unit 24 judges that the voltage becomes a reference voltage value set in advance or less than that, with which a distance from an IC card, portable terminal or the like in close proximity to the reader/writer 10 is estimated. Accordingly, the distance, at which possibility of occurrence of the null state is high, is judged (or estimated) by suitably setting the reference voltage (namely, voltage difference in the comparing unit 26). By judging in this way, whether or not it is the null state is judged in the control unit 24 which transmits a control signal that instructs the auxiliary transmitter 30 to transmit the signal F3(x) when it is in the null state.

Figure 9:
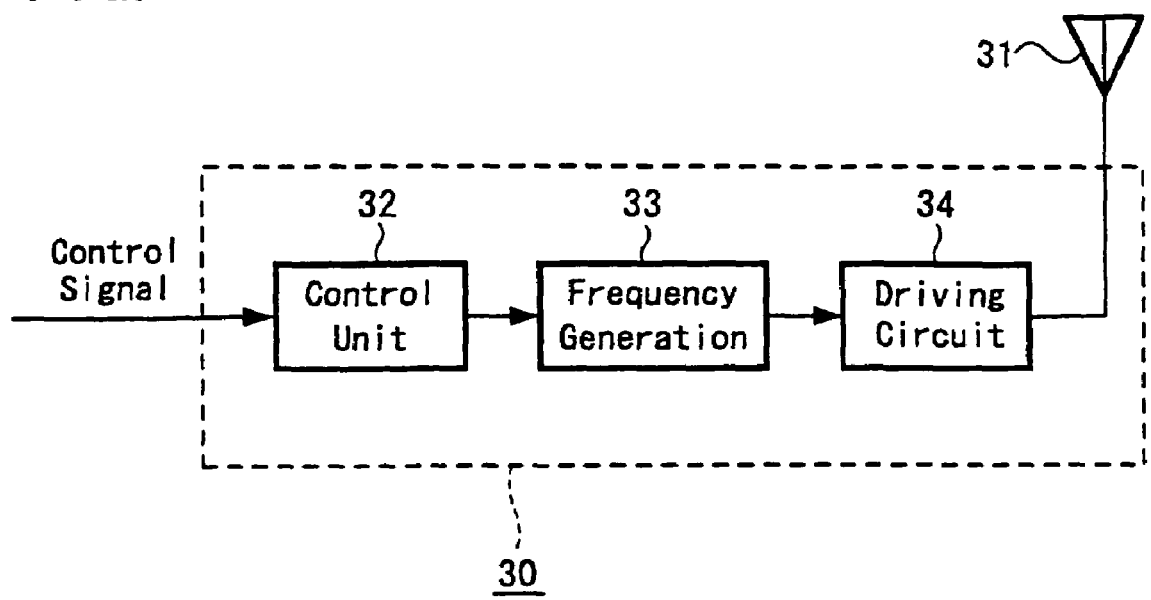
FIG. 9 is a block diagram showing a configuration of an auxiliary transmitter according to the first embodiment of the present invention.

FIG. 9 shows an example of a configuration of the auxiliary transmitter 30. The auxiliary transmitter 30 includes a control unit 32, receiving a control signal transmitted from the reader/writer 10, generating a signal of a carrier wave frequency in a frequency generating circuit 33 in accordance with contents indicated by the control signal. After being a predetermined transmission power in a driving circuit 34, the generated signal is supplied to the antenna 31 to be wirelessly transmitted. The signal transmitted from the auxiliary transmitter 30 becomes the F3(x) explained above with reference to FIG. 7 and functions as the signal acting on weakening the carrier wave F1(x) when it is in the null state. Note that, although the signal F3(x) is of the same frequency as the carrier wave F1(x) transmitted from the reader/writer 10, the signal F3(x) is a signal of reverse phase and is the signal whose level is slightly lower than that of the carrier wave F1(x).

Figure 10A:
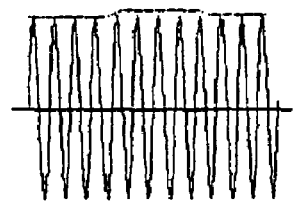
FIGS. 10A to 10C are waveform charts showing re-composite processing according to the first embodiment of the present invention.

Here, an example in which the null state is avoided by the processing of this embodiment is explained with reference to FIGS. 10A to 10C. Normally (namely, when the signal F3(x) is not being transmitted), a signal received by the reader/writer 10 during communication is the composite wave [F1(x)+F2(x)] in which the carrier wave F1(x) transmitted from the reader/writer itself and the response wave F2(x) transmitted from the RFID unit are mixed. FIG. 10A shows an example of a waveform of the composite wave [F1(x)+F2(x)], which shows the null state and there is almost no change in the amplitude.

Figure 10B:
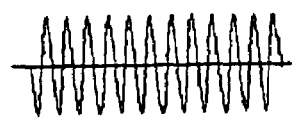
Figure 10C:

As shown in FIG. 10B, when the signal is in such state, the signal F3(x) of a carrier wave frequency canceling the occurrence of the null state is prepared. If there is a transmission of such signal, the signal received consequently by the reader/writer becomes the composite wave [F1(x)+F2(x)+F3(x)] shown in FIG. 10C, in which a signal component of the carrier wave F1(x) is weakened and a change in amplitude corresponding to the signal F2(x) appears. Hence, data transmitted from the other party can be demodulated.

In this way, the occurrence of the null state can be avoided by the signal from the auxiliary transmitter arranged in close proximity to the reader/writer 10, and so the radio communication can be performed favorably between the reader/writer and the RFID side. Particularly, since no measure against the null state is expected on the RFID side configured with an IC card, portable terminal or the like, short-distance radio communication can favorably be performed with various RFID units.

Next, a second embodiment of the present invention is explained with reference to FIG. 11. This embodiment is also a reader/writer performing short-distance radio communication with an RFID configured with an IC card, portable terminal or the like, in which the null state is avoided by a reader/writer alone.

Figure 11:
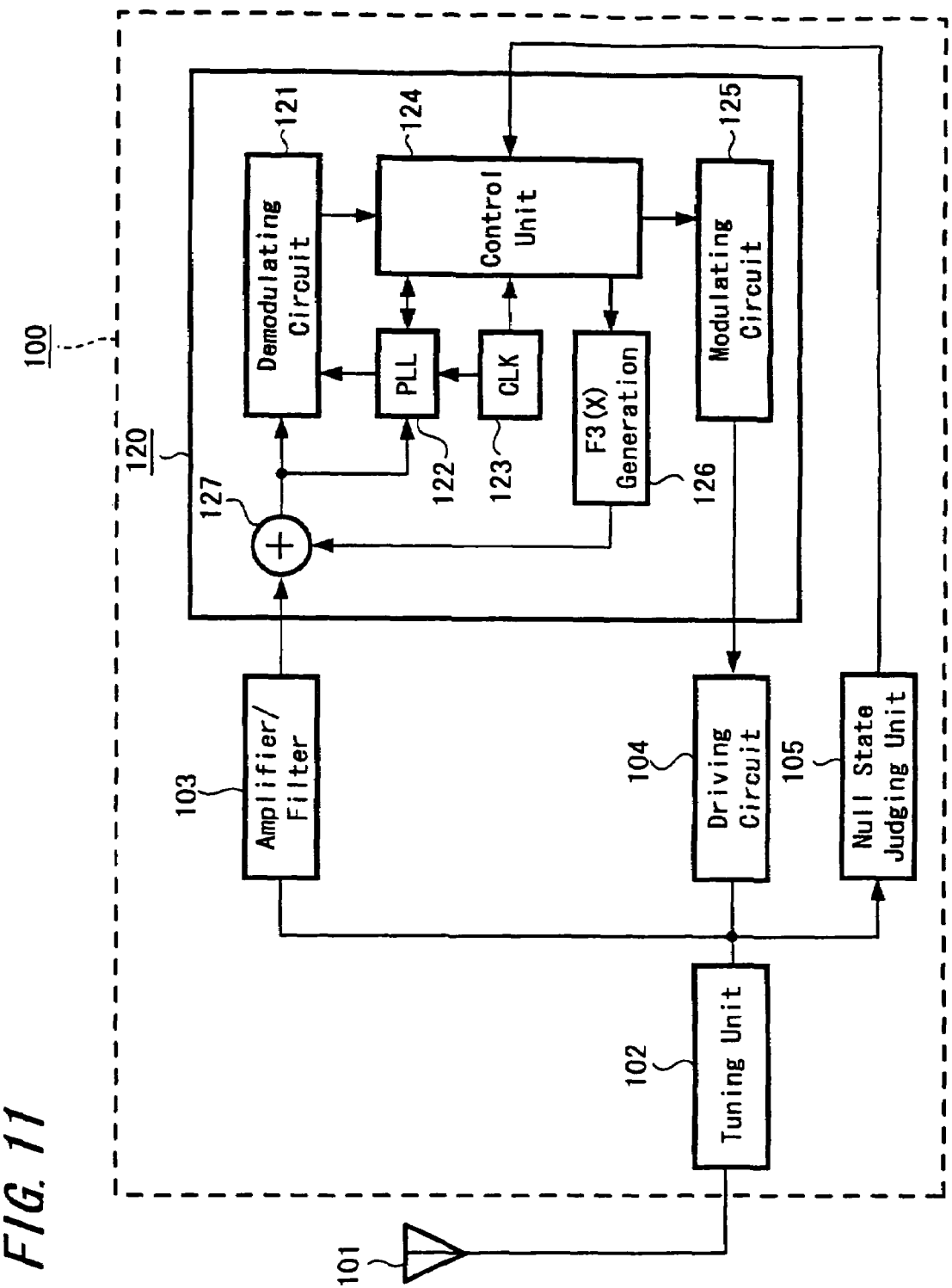
FIG. 11 is a block diagram showing a configuration according to a second embodiment of the present invention.

FIG. 11 is a block diagram showing a configuration of a reader/writer 100 according to this embodiment. First, explanation is given to a configuration for reception. A signal received by the antenna 101 is supplied to an amplifier/filter 103 through a tuning unit 102. Then, the signal is amplified and filtered in the amplifier/filter 103 to be supplied to a demodulating circuit 121 within a transmitting/receiving block 120. In the demodulating circuit 121, data ASK-modulated is demodulated from the received signal to be supplied to a control unit 124. A reference-frequency signal synchronized with the received signal is supplied to the demodulating circuit 121 from a PLL (Phase Lock Loop) circuit 122, and demodulation processing is performed using the reference signal. A reference clock is supplied to the PLL circuit 122 from a clock generating unit 123, and the PLL processing using this clock and the received data is performed. The reference clock is also supplied to the control unit 124 and the like in the transmitting/receiving block 120.

Next, explanation is given to a configuration for transmission from the reader/writer 100 shown in FIG. 11. Transmission data output from the control unit 124 is supplied to a modulating circuit 125. Then, the data is modulated by the carrier wave frequency to be supplied to a driving circuit 104 where a transmission signal with a predetermined output power is prepared. The driving circuit 104 is connected to the tuning circuit 102 and antenna 101, and the transmission signal is wirelessly transmitted from the antenna 101.

Further, the reader/writer 100 of this embodiment includes a null state judging unit 105 which judges whether it is in the null state or not from the signal obtained at a connection point between the driving circuit 104 and tuning unit 102, or the like. The judged result is supplied to the control unit 124. As a specific configuration of the null state judging unit 105, for example, the resistor 15 and comparing circuit 26 in FIG. 8 explained in the first embodiment can be used.

Furthermore, the transmitting/receiving block 120 includes an F3(x) generating circuit 126 and a mixer 127 in which a signal generated in the generating circuit 126 and a received signal output from the amplifier/filter 103 are mixed. The signal F3(x) generated in the F3(x) generating circuit 126 is a signal of the same frequency as the carrier wave and of the reverse phase thereto, acting on weakening the carrier wave F1(x) explained in the first embodiment.

In such configuration, when the signal indicating the null state is supplied to the control unit 124 from the null state judging unit 105, the signal F3(x) is generated in the F3(x) generating circuit 126 by the control of the control unit 124, being mixed with the received signal in the mixer 127. Accordingly, the signal supplied to the demodulating circuit 121 within the transmitting/receiving block 120 becomes a favorable signal in which a change in amplitude appears avoiding the null state, and communication data from the other party can favorably be demodulated. Specifically, the signal shown in FIG. 10A and signal shown in FIG. 10B explained previously are mixed in the mixer 127, and the composite wave shown in FIG. 10C is input into the demodulating circuit 121. Therefore, favorable short-distance radio communication similar to the above-mentioned first embodiment can be obtained.

Next, a third embodiment of the present invention is explained with reference to FIG. 12. This embodiment is also a reader/writer performing short-distance radio communication with an RFID configured with an IC card, portable terminal or the like, in which the null state is avoided by the processing on the transmission side of the reader/writer.

Figure 12:
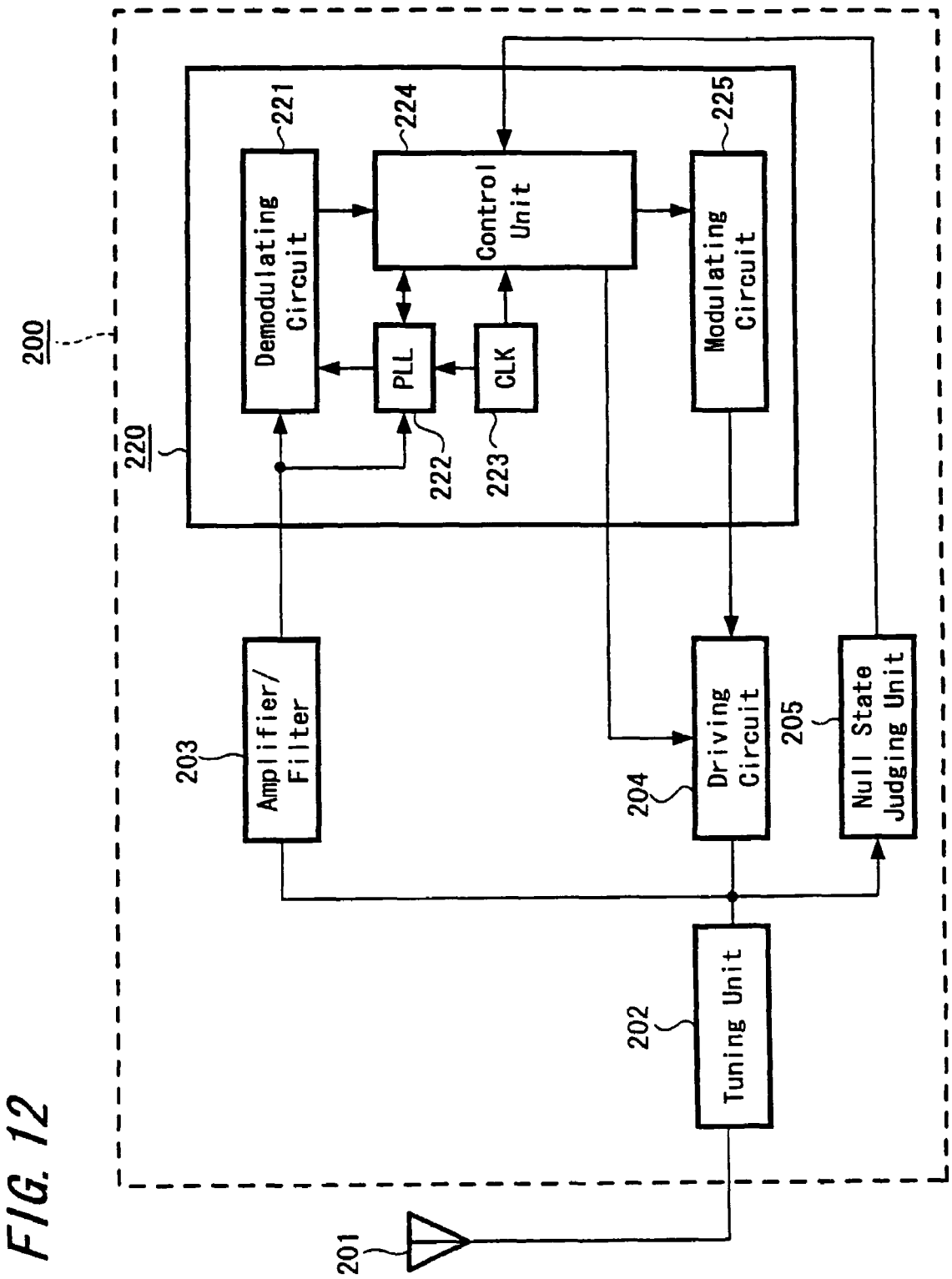
FIG. 12 is a block diagram showing a configuration according to a third embodiment of the present invention.

FIG. 12 is a block diagram showing a configuration of a reader/writer 200 according to this embodiment. First, explanation is given to a configuration for reception. A signal received by the antenna 201 is supplied to an amplifier/filter 203 through a tuning unit 202. Then, the signal is amplified and filtered in the amplifier/filter 203 to be supplied to a demodulating circuit 221 within a transmitting/receiving block 220. In the demodulating circuit 221, data ASK-modulated is demodulated from the received signal to be supplied to a control unit 224. A reference-frequency signal synchronized with the received signal is supplied to the demodulating circuit 221 from a PLL (Phase Lock Loop) circuit 222, and demodulation processing is performed using the reference signal. A reference clock is supplied to the PLL circuit 222 from a clock generating unit 223, and the PLL processing using this clock and the received data is performed. The reference clock is also supplied to the control unit 224 and the like in the transmitting/receiving block 220.

Next, explanation is given to a configuration for transmission from the reader/writer 200 shown in FIG. 12. Transmission data output from the control unit 224 is supplied to a modulating circuit 225. Then, the data is modulated by the carrier wave frequency to be supplied to a driving circuit 204 where a transmission signal with a predetermined output power is prepared. The driving circuit 204 is connected to the tuning circuit 202 and antenna 201, and the transmission signal is wirelessly transmitted from the antenna 201. Here, the driving circuit 204 of this embodiment can make the transmission power of the transmission signal weakened by an instruction from the control unit 224.

Further, the reader/writer 200 of this embodiment includes a null state judging unit 205 which judges whether it is in the null state or not from the signal obtained at a connection point between the driving circuit 204 and tuning unit 202, or the like. The judged result is supplied to the control unit 224. As a specific configuration of the null state judging unit 205, for example, the resistor 15 and comparing circuit 26 in FIG. 8 explained in the first embodiment can be used.

Furthermore, in the case in which the signal indicating the null state is supplied to the control unit 224 from the null state judging unit 205, the transmitting/receiving block 220 gives an instruction to weaken a carrier wave component output from the driving circuit 204 and the state of signal wirelessly transmitted from the antenna 201 is changed. Here, the processing previously explained of mixing the signal F3(x) with the carrier wave F1(x) is employed as processing of weakening the carrier wave component. By doing such processing, consequently the signal received by the reader/writer 200 becomes the state shown in FIG. 10C in which the null state is avoided and the composite wave is received to be input into the demodulating circuit 221. Therefore, favorable short distance radio communication similar to that in the first and second embodiments mentioned above can be performed.

In addition, an embodiment of the present invention can be applied to the cases in which an IC card or IC tag is incorporated or attached to a portable terminal other than a mobile What is clamed is:

1. A reader/writer performing radio communication with a radio communication terminal in close proximity thereto, comprising:
   an antenna for transmitting a carrier wave of a predetermined frequency and receiving a composite wave of said carrier wave and a modulated signal of a signal having the frequency identical to that of said carrier wave transmitted from said radio communication terminal;
   a demodulating unit for demodulating the composite wave received by said antenna;
   a judging unit for judging whether a null state has occurred when said radio communication terminal is in close proximity; and
   a carrier-wave control unit having an auxiliary antenna provided in the proximity of said antenna for reducing a component of said carrier wave input into said demodulating unit by wirelessly transmitting a signal of a reverse phase to said carrier wave from the auxiliary antenna when said judging unit judges that the null state has occurred.

2. A reader/writer according to claim 1,
   wherein the composite wave received by said antenna is a composite wave including a signal amplitude-modulated by said radio communication terminal, and
   a judgment that the null state has occurred is made by judging that a change in amplitude of said composite wave is not detected in the null state.

3. A reader/writer according to claim 2,
   wherein said judgment is performed based on voltages at both ends of a resistor to which said composite wave received is supplied.

4. A communication method of a reader/writer performing radio communication with a radio communication terminal in close proximity thereto, comprising:
   transmitting a carrier wave of a predetermined frequency;
   receiving a composite wave of said carrier wave and a modulated signal of said carrier wave transmitted from said radio communication terminal;
   demodulating said composite wave received;
   judging whether a null state has occurred when said radio communication terminal is in close proximity; and
   wirelessly transmitting a signal of a reverse phase to said carrier wave from an auxiliary antenna when judged that the null state has occurred.

5. A reader/writer performing radio communication with a radio communication terminal in close proximity thereto, comprising:
   an antenna for transmitting a carrier wave of a predetermined frequency and receiving a composite wave of said carrier wave and an amplitude-modulated signal of a signal having the frequency identical to that of said carrier wave transmitted from said radio communication terminal;
   a demodulating unit for demodulating the composite wave received by said antenna;
   a judging unit having a resistor for judging whether a null state has occurred based on voltages at both ends of a resistor to which said composite wave received is supplied when said radio communication terminal is in close proximity; and
   a carrier-wave control unit for reducing a component of said carrier wave input into said demodulating unit when said judging unit judges that the null state has occurred.

6. A reader/writer according to claim 5,
   wherein said carrier-wave control unit reduces the component of said carrier wave input into said demodulating unit by wirelessly transmitting a signal of a reverse phase to said carrier wave from an auxiliary antenna provided in the proximity of said antenna.

* * * * *